UNITED STATES PATENT OFFICE.

JAMES T. McKIM, OF THORNTOWN, INDIANA.

PAINT.

SPECIFICATION forming part of Letters Patent No. 442,195, dated December 9, 1890.

Application filed October 4, 1890. Serial No. 367,106. (No specimens.)

*To all whom it may concern:*

Be it known that I, JAMES T. McKIM, a citizen of the United States, residing at Thorntown, in the county of Boone and State of Indiana, have invented a new and useful Improvement in Paint Compounds, of which the following is a specification.

My invention relates to an improved paint compound.

The object of my improvement is to provide a paint compound which may be easily compounded and applied, and which will when dried, form a tight, durable, and elastic covering for roofs and other exposed places, said covering neither running under high temperature nor cracking under low temperature, and presenting a neat appearance.

My improved paint compound consists of the following ingredients, namely: calcareous ocher, iron-ore paint, litharge, argol, japan, coal-tar, and benzine.

The paint is compounded in the following manner: I take fourteen pounds of calcareous ocher, preferably such as is found near Amestown, in the State of Alabama; seven pounds of iron-ore paint, as it is usually prepared for commercial purposes; three pounds of litharge, and one pound of argol, (crude tartar.) These ingredients I mix thoroughly in a suitable grinding-mill, and then heat the mass to about 160° Fahrenheit, after which it is left at rest for about seventy-two hours to become cooled and thoroughly combined. I then take of the above compound, which I call, for convenience, "calcareous compound," twenty-four parts, by measurement, ten parts of japan, and three hundred parts of coal-tar. These are thoroughly mixed together to form a smooth even semi-liquid, to which I then add sufficient benzine or other similar solvent to enable the paint to be easily spread with a brush.

In applying the paint to different materials, as iron, wood, or paper, it will be necessary to vary to some extent the proportions of japan, coal-tar, and benzine to attain the best results, and I therefore do not wish to be understood as confining myself exactly to the proportions of these articles here given.

I claim as my invention—

The above-described paint compound, consisting of calcareous ocher, iron-ore paint, litharge, argol, japan, coal-tar, and benzine, all combined in substantially the manner and proportions set forth.

JAMES T. McKIM.

Witnesses:
  A. MOFFITT,
  O. B. BEADLE.